United States Patent Office 3,625,715
Patented Dec. 7, 1971

3,625,715
POLYETHYLENE OXIDE DAMPENING SYSTEM FOR LITHOGRAPHIC PRESSES
Salvatore Nasca, 74 Birch Lane, Woodmere, N.Y. 11598
No Drawing. Filed July 1, 1970, Ser. No. 51,694
Int. Cl. C09d 5/00; C09k 3/00
U.S. Cl. 106—2          2 Claims

ABSTRACT OF THE DISCLOSURE

The volatility and atmospheric contamination of alcoholic dampening solutions is avoided by the use of an aqueous solution of polyethylene oxide of molecular weight 50,000 to 150,000 with isopropyl alcohol, diethylene glycol, glycerine, a silicone-glycol copolymer surfactant and as an antiforming agent preferably a silicone emulsion. The solution may be substituted for conventional alcohol solutions without change in operating procedures.

BACKGROUND OF THE INVENTION

In the operation of the lithographic press, it is conventional to employ isopropyl alcohol as a dampening agent. Surprisingly large amounts of alcohol are required. For example, one make of four-color press would normally use between 25 and 35 gallons of alcohol per shift. This alcohol evaporates into the atmosphere so that a plant with just four such presses would dissipate about 18 gallons of alcohol per hour into the plant, thus creating an extremely undesirable environment from the point of view of health of the employee, as well as from the general pollution of the atmosphere. Further, where there are stringent fire regulations, the plant may not keep more than one drum of the highly inflammable alcohol in the press room. Since four presses would use up a drum every two hours, it will be appreciated that rather substantial outside storage facilities are required plus the expense of having to provide personnel to continuously bring drums of alcohol from a remote storage area into the building. Thus the present alcohol dampening solution is both a health hazard and a fire hazard.

The solution of this invention employs a minimal amount of alcohol and normally results in dissipation into the atmospere of but about 8 ounces of alcohol per press per shift, as compared to the approximately 4000 ounces of alcohol per press per shift for the prior dampening solution.

An unexpected and surprising side benefit resulted from the use of the dampening system of the present invention: The reduction in the quantity of ink and water used in the printing operation. More specifically it was found that from 25% to 50% less ink and 30% less water were required with the dampening solution of this invention as compared to the prior system. Further, the use of the present dampening system minimizes the amount of storage space needed for dampening solution use, resulting in additional economies.

One of the problems of introducing a new system is to obtain a proper reception from personnel involved in the operation of the equipment and the printing industry. Where the pressmen are very familiar with the operation of a particular press with a given combination of ink and other materials, he is reluctant to make changes in any of the materials, as this may require readjustment of the press. Accordingly, for easy acceptance, it is desirable that the new material not substantially affect the operation of the equipment. The present composition does not require substantive changes in procedure.

Accordingly, it is a primary object of this invention to provide a dampening solution which results in minimal amount of contamination in the atmosphere.

Further, it is an object of this invention to provide an economical dampening solution.

A still further object of this invention is to provide a firesafe dampening solution.

Still a further object of this invention is to provide a dampening solution with low health hazard to personnel.

Another object is to provide a moistening solution which handles like a conventional isopropanol alcohol solution.

A further object of this invention is to provide a solution which minimizes the amount of ink required in a printing operation.

These and other objects, features and advantages of the invention will, in part, be pointed out with particularity, and will, in part, become obvious from the more detailed description of the invention, taken in conjunction with the accompanying drawing which forms an integral part thereof.

The dampening agent was prepared as follows:

FORMULATION A

| | Ounces |
|---|---|
| Polyethylene Oxide (M.W. 50,000 to 150,000) | 30 |
| Silicone (Dow Corning F-11-522) | 2½ |
| Isopropyl alcohol | 64 |
| Diethylene glycol | 2 |
| Glycerine (99% pure) | 4 |
| Water | 485 |

The polyethylene oxide is added gradually to the water until solution is complete. In turn there is incorporated the silicone, the isopropyl alcohol, the glycol dimethelyene glycol and the glycerine.

FORMULATION B

| | Ounces |
|---|---|
| Anti-foam agent | 1 |
| Water | 10 |

Formula B is gradually added to Formula A with stirring.

The foregoing solution was substituted for the conventional alcohol dampening solution and tested on a press using an automatic dampening system and successfully operated with just minor routine adjustments of the press by the operator. In running the test a 3½% solution of the composition in water was used. This was in contrast to the 30% alcohol solution previously employed. Repeated tests show that a substantial reduction in the amount of ink used, in the order of 25 to 50% over that employing the standard isopropyl alcohol dampening solution, was obtained. No difference in the printing quality was discernible.

Some latitude in the formulation is permissible as indicated in the following table:

| | Ounces | |
|---|---|---|
| | Preferred | Approximate operative range |
| Polyethylene oxide | 24 | 16–48 |
| Surfactant | 2½ | 1½–5 |
| Isopropyl alcohol | 64 | 32–128 |
| Diethylene glycol | 2 | 1–4 |
| Glycerine | 4 | 1–8 |
| Anti-foaming agent | 1 | ([1]) |
| Water | 495 | |

[1] As determined experimentally to prevent foaming.

The polyethylene oxide employed should be water-soluble, have a molecular weight between 50,000 and 150,000; water solutions should be nearly Newtonian exhibiting little or no dependence of viscosity on shear ratio.

At the present time the only type sufactant found operative for this purpose is of the silicone-glycol copolymer type. One such composition is Dow Corning Corporation (Midland, Mich.) F-1-1522 fluid.

The choice of anti-foaming agent is not critical; however, silicone types are preferred. The quantity required to prevent foaming may be readily determined empirically.

The use of this improved dampening solution results in a much more comfortable and healthy plant environment. In addition substantial savings in ink and water are obtained. Unlike alcohol, the present composition will not evaporate, needs no refrigeration and requires no special equipment for storage and feeding to presses.

The composition is non-flammable and is subject to more favorable fire insurance factors than the prior alcohol composition.

An additional saving results from the typical 85% reduction in storage space for storing the present dampening composition over the previously employed alcohol dampening agent. Further, the elimination of the fire hazard facilitates indoor storage, outside storage being a problem in urban areas.

Having thus disclosed the best embodiment of the invention presently contemplated, it is to be understood that various changes and modifications may be made by those skilled in the art without departing from the spirit of the invention.

What I claim as new and desire to secure by Letters Patent is:

1. An aqueous dampening solution for lithographic presses and the like comprising:
    (a) a silicone-glycol copolymer 0.03% to 0.10% by weight;
    (b) water soluble polyethylene oxide having a molecular weight in the range 50,000 to 150,000 in amount of 3-9% by weight;
    (c) isopropyl alcohol—6% to 24% by weight;
    (d) diethylene glycol—0.2 to 0.8% by weight; and
    (e) glycerine—0.2 to 1.6% by weight.
2. The aqueous dampening solution of claim 1 wherein a silicone emulsion antiforming agent is employed.

References Cited
UNITED STATES PATENTS

| | | | |
|---|---|---|---|
| 3,354,824 | 11/1967 | Griffith et al. | 106—2 |
| 3,398,002 | 8/1968 | Bondurant et al. | 106—2 |
| 3,547,632 | 12/1970 | Nadeau | 106—2 |

DONALD J. ARNOLD, Primary Examiner

A. H. KOECKERT, Assistant Examiner

U.S. Cl. X.R.

101—451; 260—29.2 EP, 29.2 M